Feb. 13, 1968  D. P. HASS ETAL  3,368,421
BREAK-AWAY SHIFT LEVER

Filed June 11, 1965  2 Sheets-Sheet 1

INVENTORS
DAVID P. HASS
ALFRED W. SCHULTZ

Hoffmann and Yount
ATTORNEYS

Feb. 13, 1968  D. P. HASS ET AL  3,368,421
BREAK-AWAY SHIFT LEVER
Filed June 11, 1965  2 Sheets-Sheet 2

INVENTORS
DAVID P. HASS
BY ALFRED W. SCHULTZ

*Hoffmann and ...*
ATTORNEYS

United States Patent Office
3,368,421
Patented Feb. 13, 1968

3,368,421
BREAK-AWAY SHIFT LEVER
David P. Hass, Detroit, and Alfred W. Schultz, East Detroit, Mich., assignors to Eaton Yale & Towne Inc., a corporation of Ohio
Filed June 11, 1965, Ser. No. 463,266
17 Claims. (Cl. 74—493)

ABSTRACT OF THE DISCLOSURE

A gear shift lever of an automotive vehicle pivots in response to pivoting movement of the steering wheel of the vehicle to a non-steering position. In one embodiment when the steering wheel pivots to its non-steering position, a pin member located in a slot in the shift cam which cooperates with a portion of the gear shift moves and a biasing spring biases a portion of the gear shift lever into the slot, thereby effecting pivotal movement of the gear shift lever. In another embodiment, the steering wheel of the vehicle upon pivotal movement engages a portion of the gear shift lever and effects pivotal movement of that portion of the gear shift lever with the steering wheel.

---

The present invention relates to vehicles having a steering column with a gear shift lever supported thereon and, particularly, to a steering column including a driving member adapted to be connected to the steering wheel of the vehicle and a driven member rotatable upon rotation of the driving member and wherein the driving member is pivotal relative to the driven member so as to move the steering wheel to a remote position when not in use.

The principal object of the present invention is the provision of a new and improved mechanism, as noted above, wherein the gear shift lever of the vehicle may be mounted on the steering column immediately adjacent to the steering wheel and does not interfere with the pivoting movement of the steering wheel to its remote position.

A further object of the present invention is the provision of a new and improved mechanism which includes a driving member adapted to be connected to a vehicle steering wheel and which is pivotal relative to a driven member to effect pivoting of the vehicle steering wheel to a non-steering position, and wherein the gear shift lever mounted on the steering column adjacent to the steering wheel pivots with the steering wheel to an out-of-the-way position in response to pivoting of the steering wheel.

A more specific object of the present invention is the provision of a new and improved mechanism having a driving member adapted to be connected to the steering wheel of the vehicle and pivotal to effect movement of the steering wheel to a non-steering position and a gear shift lever which is supported so as to pivot about an axis transverse to the axis of rotation of the driving member in response to pivoting of the driving member, thereby permitting pivoting movement of the steering wheel without any interference from the gear shift lever and thereby enabling the gear shift lever to be located closely adjacent to the steering wheel.

Another object of one form of the present invention is the provision of a new and improved mechanism having a driving member adapted to be connected to the steering wheel of the vehicle and pivotal so as to effect movement of the steering wheel to a non-steering position, and a gear shift lever pivotally supported for movement upon movement of the steering wheel to a non-steering position by a biasing means upon movement of the steering wheel to its non-steering position.

An object of another form of the present invention is the provision of a new and improved mechanism including a driving member adapted to be connected to the steering wheel of the vehicle and which is pivotal to move the steering wheel to a non-steering position, and a gear shift lever extending so as to be engaged by the steering wheel on its pivoting movement and pivotally supported so as to be pivoted with the steering wheel when the steering wheel is moved to its non-steering position.

Further objects and advantages of the present invention will be apparent to those skilled in the art to which it relates from the following detailed description of the preferred embodiments thereof made with reference to the accompanying drawings forming a part of this specification and in which.

The present invention provides a new and improved mechanism for use in a vehicle and which includes a steering column including a driving member adapted to be connected to the steering wheel of a vehicle and a driven member rotatable upon rotation of the driving member and wherein the driving member is pivotal relative to the driven member to effect movement of the steering wheel to an out-of-the-way non-steering position. The present invention provides a gear shift lever supported adjacent to the steering wheel and which is pivotal upon pivoting movement of the steering wheel so as not to interfere with the pivoting movement of the steering wheel to its non-steering position, thereby permitting the gear shift lever to be located immediately adjacent to the steering wheel.

Figure 1:
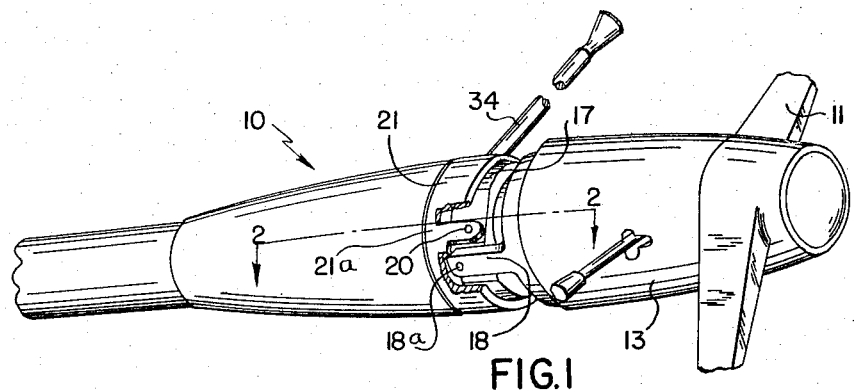
FIG. 1 is a perspective side elevational view of a mechanism embodying the present invention.

A preferred embodiment of the present invention is illustrated in FIG. 1. FIG. 1 illustrates a vehicle steering column 10 having a steering wheel 11 supported at one end thereof. The steering wheel 11 is connected to a driving member 12 rotatably supported by a suitable housing 13 so as to rotate upon rotation of the steering wheel 11. The steering column also includes a driven member 14 rotatable upon rotation of the driving member 12, and a drive transmitting means in the form of a universal joint 15 connected between the driving and driven members and operable to transmit torque therebetween.

A gimbal member 17 is positioned between the driving member 12 and driven member 14 in encircling relation with the universal joint 15. The housing member 13 is supported for pivotal movement relative to the gimbal member 17. The housing 13 specifically includes a pair of arms 18 which extend on diametrically opposite sides of the gimbal member 17 and are pivotally connected thereto by pivot pins 18a. A suitable latch mechanism, not shown, is operable to lock the housing member 13 to the gimbal member 17 to prevent relative pivoting movement thereof. However, this latch means is operable to be released and permit pivoting movement of the steering wheel 11 about the axis of the pins 18a. In this manner, the steering wheel 11 may be moved between various steering positions and is adjustable to the desires of the particular operator of the vehicle.

The steering wheel 11 is also pivotal to a non-steering position out of the way so as to facilitate the entry and exit of the vehicle operator into the driver's seat of the vehicle. The steering wheel 11 and gimbal member 17 are pivoted as a unit about an axis 20 for this purpose. A suitable latch mechanism, not shown, releasably connects the gimbal member 17 to a lower housing member 21 of the steering column 10. The lower housing member 21 of the steering column 10 has a pair of projecting arms 21a which extend outwardly thereof and are pivotally connected by means of pivot pins to the gimbal member 17 to provide the pivot axis 20. Upon release of the latch means releasably connecting the gimbal member 17 to the lower housing 21, the gimbal member 17 and steering wheel 11 may pivot about the axis 20, and upon movement of the steering wheel 11 to its non-steering position, the gimbal member 17 will pivot about the pivot axis 20. The specific details of the locking mechanisms and the construction of the gimbal member, as noted hereinabove, as well as the details of the universal joint, do not form a part of the present invention and have not been described in detail. However, reference is hereby made to copending application Ser. No. 407,818 disclosing these structures in detail, and the disclosure therein is incorporated herein by reference.

The steering column 10 supports a gear shift lever 30. The gear shift lever 30 is carried by a projecting portion 31 of a shift tube 32 of the vehicle. The shift tube 32 is rotatably supported by the driven member 14 and when rotated effects shifting of the gears of the vehicle. The shift tube 32 is rotated by manual movement of the gear shift lever 30. A suitable pivot pin 33 pivotally supports the gear shift lever 30 on the portion 31 of the shift tube 32 for pivoting movement about an axis transverse to the axis of rotation of the driven member 14. The gear shift lever 30 has a projecting lever portion 34 for manual engagement to effect movement of the gear shift lever and an actuating portion 35 which projects toward the driven member 14 from the pivot pin 33.

The actuating portion 35 of the gear shift lever member 30 cooperates with a conventional shift cam 36 which has a plurality of notches therein and which is supported by a portion of the lower housing 21. The shift cam 36 has a plurality of notches therein and is of conventional construction with the notches corresponding to the various shift positions of the shift lever. A pin member 40 carried by the shift tube 32 acts on the portion 35 of the shift lever 30 opposite the side which engages in the notches in the shift cam 36 and a spring 41 biases the pin 40 toward the portion 35 so as to bias the portion 35 of gear shift lever 30 into the notches in the shift cam. From the above description, it should be apparent that the shift lever 30 of the automobile vehicle is manually moved between its gear shift positions along the cam 36 and when so moved, rotates the shift tube 32 relative to the driven member 14 so as to effect shifting of the gears of the vehicle in a well-known manner. Moreover, the notches in the shift cam 36 provide for holding the gear shift lever in the position to which it is shifted, and the gear shift lever may be released therefrom by pivoting about the pivot pin 33.

In accordance with the present invention, the gear shift lever 30 pivots about the pin 33 in response to a pivoting movement of the driving member 12 about the axis 20. Specifically, the gear shift lever portion 34 pivots away from the steering wheel 11 upon pivoting of the driving member 12 and, in this manner, will not interfere with the pivoting of the steering wheel 11 about the axis 20. This also enables the gear shift lever 30 to be located immediately adjacent to the steering wheel.

Figure 2:
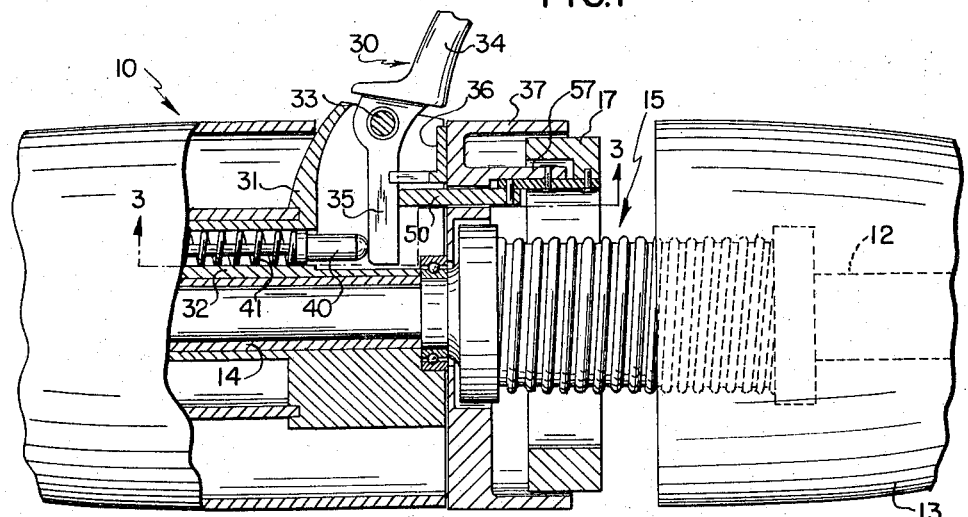
FIG. 2 is a fragmentary sectional view of the mechanism shown in FIG. 1, taken approximately along the section line 2—2 of FIG. 1.
Figure 3:
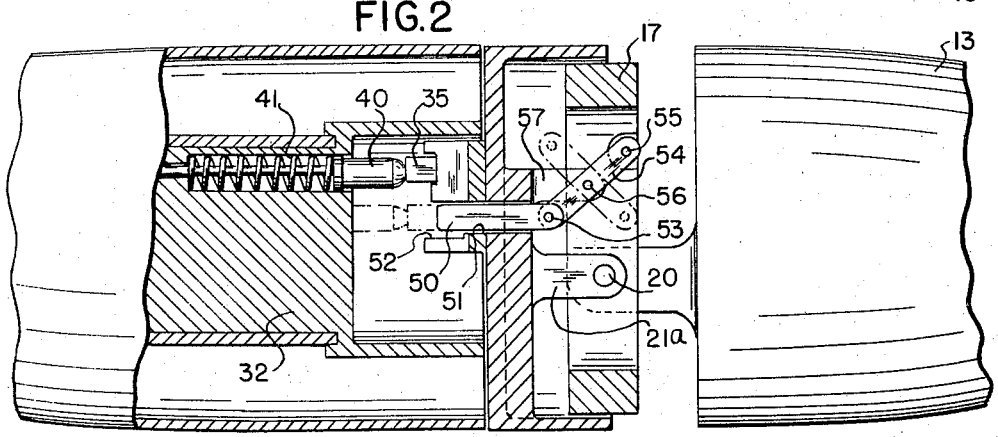
FIG. 3 is a fragmentary sectional view of the mechanism shown in FIG. 2, taken approximately along the section line 3—3 of FIG. 2.

The pivoting movement of the lever member 30 in the embodiment shown in FIGS. 1–3 can occur only when the gear shift lever member 30 is in its park position. When in its park position, the portion 35 of the gear shift member 30 and pin 40 are located in the dot-dash positions shown in FIG. 3. When in this position, the portion 35 of the gear shift member 30 is engaged on one side by the pin member 40, as it is at all times, and on its other side by a pin member 50. The pin member 50 extends through an opening 51 in the shift cam 36 and through a recess on notch portion 52 thereof into engagement with the portion 35 of the shift lever 30. The end of the pin member 50 opposite the end which engages the portion 35 of the gear shift lever is pivotally connected by a pivot pin 53 to a lever member 54 which, in turn, is pivotally connected at 55 to the gimbal member 17. The lever member 54 is pivoted intermediate its ends by means of a pivot pin 56 to a lug portion 57 projecting from a part of the lower housing 21.

From the above description, it should be apparent that upon pivoting movement of the gimbal member 17 about the pivot axis 20, the pivot point 55 thereof will move about the pivot axis 20 and the link member 54 and be moved to its dot-dash position shown in FIG. 3. When moved to this position, the pin member 50 moves or retracts away from the portion 35 of the gear shift lever 30 and into the notch 52. When the pin member moves in this manner, the biasing spring 41 causes movement of the portion 35 of the gear shift lever into the notch 52 in the shift cam 36. When the portion 35 of the lever 30 moves into the notch 52 in the shift cam, the portion 34 of the gear shift lever which projects outwardly from the steering column 10 moves away from the steering wheel 11, and thus moves to an out-of-the-way position not interfering with the pivoting movement of the steering wheel 11.

Figure 4:
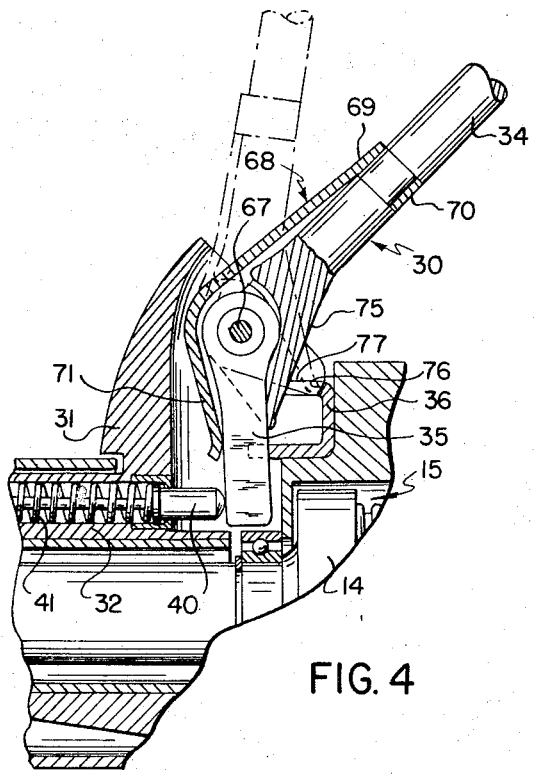
FIG. 4 is a fragmentary sectional view of a modified mechanism embodying the present invention.

A modification of the present invention is illustrated in FIG. 4. The modification shown in FIG. 4 has parts which are identical to the parts described hereinabove in connection with the embodiment shown in FIGS. 1–3, and the same reference characters are used in connection with the embodiment of FIG. 4 to designate these corresponding parts. The gear shift lever 30 in the embodiment shown in FIG. 4 includes a portion 34 which is adapted to be manually engaged to effect shifting of the gears of the vehicle and a portion 35 which cooperates with a shift cam 36 in the manner described hereinabove in connection with the embodiment of FIG. 1.

The portions 34 and 35 of the gear shift lever member 30 are pivotally connected by a pivot pin 67. A spring biased pin member 40 biases the portion 35 into engagement with the shift cam 36. A suitable biasing spring 68 cooperates with the portions 35 and 34 of the lever member and biases the portion 34 of the lever member in a clockwise direction about the axis of the pivot pin 67, as viewed in FIG. 4. The biasing spring 68 includes an annular sleeve portion 69 which encircles the portion 34 and is received in a notch 70 in the portion 34 of the lever member 30 and an elongated reaction portion 71 which engages the portion 35 of the lever member 30. The portion 34 of the gear shift lever member 30 has a projecting flange portion 75 which engages the portion 35 of the lever member to limit the clockwise pivoting of the lever portion 34. The flange portion 75 also moves adjacent to an upper flange portion 76 of the shift cam 36 when the vehicle operator shifts the vehicle drive by moving the gear shift lever. The flange portion 76 of the shift cam 36 has a notch 77 therein which lies in alignment with the flange portion 75 of the shift lever 30 when the shift lever 30 is in its park position.

In the embodiment shown in FIG. 4, the gear shift lever portion 34 pivots about the pivot pin 67 in response to pivoting of the driving member 12 about the axis 20. Specifically when the driving member 12, steering wheel 11, and the gimbal member 17 pivot about the pivot axis 20 when the gear shift lever 30 is in its park position the periphery of the steering wheel engages the portion 34 of the shift lever and moves the portion 34 of the shift lever against the bias of the spring 68 and moves the portion 75 of the shift lever 34 into the notch 77 in the flange portion 76 of the shift cam. Thus, the steering wheel forms the means to effect the pivoting of the lever portion 34 in this embodiment of the invention. When the steering wheel is returned to its normal steering position, the spring member 68 returns the shift lever 34 to its position shown in full lines in FIG. 4. When this occurs, pivoting movement of the portion 34 of the gear shift lever 30 in a clockwise direction due to the action of the spring 68 terminates and the gear shift lever 30 is returned to its position for shifting gears.

Figure 6:
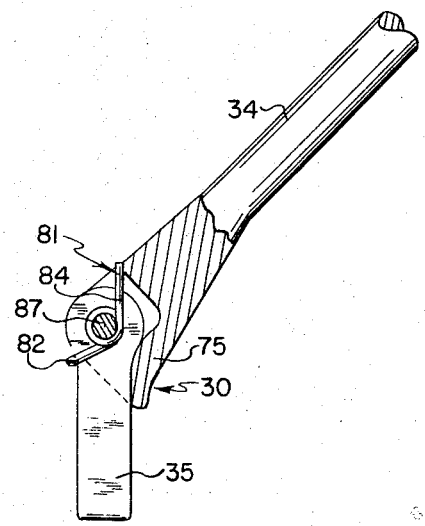
FIG. 6 is a sectional view of the mechanism of FIG. 5, taken approximately along the section line 6—6 of FIG. 5.
Figure 5:
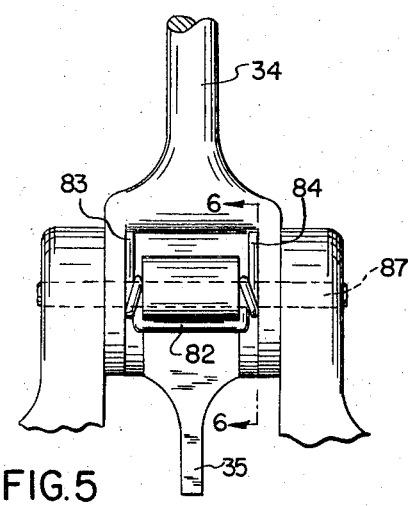
FIG. 5 is a further modified mechanism embodying the present invention.

A further modification of the present invention, is shown in FIGS. 5, 6 and the same reference numerals are used to designate the parts of the modification shown in FIGS. 5, 6 which are used to designate corresponding parts of the modification shown in FIGS. 1–3. The modification disclosed in FIGS. 5, 6 includes a gear shift lever 30 having a portion 34 which is manually moved in order to effect rotation of the vehicle shift tube and a portion 35 which cooperates with a shift cam in the same manner as that disclosed in FIG. 4. The operation of the shift lever and its cooperation with the steering mechanism are identical to that disclosed and described above in connection with the modification shown in FIG. 4. However, the means for biasing the portion 34 of the gear shift lever 30 in a clockwise direction is somewhat different. The means for biasing the portion 34 of the shift lever 30 in the embodiment shown in FIGS. 5 and 6 comprises a torsion spring member 81 which is of a general U-shape having a base portion 82 which engages one side of the portion 35 of the lever member 34 and leg portions 83 and 84 which encircle a pivot pin 87 and whose end portions engage the lever member 34 so as to bias the lever member 34 in a clockwise direction so that the flange portion 75 thereof engages the side of the portion 35 of the lever member 30 opposite the side which is engaged by the portion 82 of the spring 81. In order to effect the pivoting movement of the gear shift lever 30 in the embodiment shown in FIG. 5, the outer rim of the steering wheel engages the lever portion 34 and moves it against the bias of the spring 81 and into a notch in the shift cam, not shown, aligned therewith when the gear shift lever 30 is in its park position similar to that in connection with FIG. 4. When the steering wheel is returned to its normal position, the spring means 60 biases the lever member 34 back to its normal shifting position.

It should be apparent from the description hereinabove that applicants have provided a new and improved vehicle mechanism wherein the gear shift lever of the vehicle is pivoted in response to movement of the steering wheel of the vehicle to a non-steering position. It should be further apparent that certain modifications, changes, and adaptations may be made in the structure described hereinabove by those skilled in the art to which it relates, and it is hereby intended to cover all such modifications, changes, and adaptations which fall within the scope of the appended claims.

Having described our invention, we claim:

1. In a vehicle, a driving member adapted to be connected to the vehicle steering wheel for rotation upon rotation of the steering wheel, a driven member rotatable upon rotation of the driving member, means supporting said driving member for pivotal movement relative to said driven member about an axis transverse to the axis of rotation of the driven member to provide for movement of said steering wheel to a non-steering position, means interconnecting the driving and driven members to transmit rotary motion therebetween and allowing said pivoting movement of said driving member, and a gear shift mechanism adjacent said driven member and movable relative thereto to effect shifting of the drive of the automotive vehicle and at least a portion of said gear shift mechanism supported to pivot about a pivot axis relative to said driven member in response to pivoting of said driving member to its said non-steering position.

2. In a vehicle mechanism, a driving member adapted to be connected to the vehicle steering wheel for rotation upon rotation of the steering wheel, a driven member rotatable upon rotation of the driving member, means interconnecting the driving and driven members to transmit rotary motion therebetween, means supporting said driving member for pivotal movement relative to said driven member about an axis transverse to the axis of rotation of said driven member to provide for movement of said steering wheel to a non-steering position, a gear shift mechanism adjacent said driven member and movable relative thereto to effect shifting of the drive of the automotive vehicle, and means supporting at least a portion of said gear shift mechanism for pivoting movement about a pivot axis relative to said driven member in response to pivoting of said driving member to its said non-steering position.

3. In a vehicle mechanism, a driving member adapted to be connected to the vehicle steering wheel for rotation upon rotation of the steering wheel, a driven member rotatable upon rotation of the driving member, means interconnecting the driving and driven members to transmit rotary motion therebetween, means supporting said driving member for pivotal movement relative to said driven member about an axis transverse to the axis of rotation of said driven member to provide for movement of said steering wheel to a non-steering position, a gear shift lever adjacent said driven member and movable relative thereto to effect shifting of the drive of the automotive vehicle and having a park position, and means supporting at least a portion of said gear shift lever for pivoting movement about a pivot axis relative to said driven member in response to pivoting of said driving member to its said non-steering position when said gear shift lever is in its park position.

4. In a vehicle mechanism, a driving member adapted to be connected to the vehicle steering wheel for rotation upon rotation of the steering wheel, a driven member rotatable upon rotation of the driving member, means interconnecting the driving and driven members to transmit rotary motion therebetween, means supporting said driving member for pivotal movement relative to said driven member about an axis transverse to the axis of rotation of said driven member to provide for movement of said steering wheel to a non-steering position, a gear shift lever adjacent said driven member and movable relative thereto to effect shifting of the drive of the automotive vehicle and at least a portion thereof supported for pivotal movement about a pivot axis relative to said driven member, and means for effecting pivotal movement of said portion of said gear shift lever in response to pivoting of said driving member to its said non-steering position.

5. In a vehicle mechanism as defined in claim 4 wherein said gear shift lever has one portion which is supported for pivotal movement and another portion engageable with a shift cam having notches which receive said another portion of said gear shift lever in different positions thereof, and said means for effecting pivotal movement of said one portion of said gear shift lever comprises a biasing spring for moving said another portion of said gear shift lever into a notch in the shift cam upon pivoting movement of the steering wheel.

6. In a vehicle mechanism as defined in claim 4 wherein said driving member is connected to the vehicle steering wheel and said means for effecting pivotal movement of the gear shift lever comprises a portion of the steering wheel of the automotive vehicle which engages said portion of said shift lever upon movement thereof to effect the movement of said portion of said gear shift lever.

7. In a vehicle mechanism, a driving member adapted to be connected to the vehicle steering wheel for rotation upon rotation of the steering wheel, a driven member rotatable upon rotation of the driving member, means interconnecting the driving and driven members to transmit rotary motion therebetween, means supporting said driving member for pivotal movement relative to said driven member about an axis transverse to the axis of rotation thereof to provide for movement of said steering wheel to a non-steering position, a gear shift lever adjacent said driven member and movable relative thereto to effect shifting of the drive of the automotive vehicle, means supporting a first portion of said gear shift lever for pivotal movement about a pivot axis relative to said driven member, a shift cam adjacent said gear shift lever, means biasing a second portion of said gear shift lever into engagement with said shift cam, said shift cam having a notch therein corresponding with the park position of the gear shift lever and into which said second portion of said gear shift lever moves upon pivoting movement of said driving member to move said steering wheel to its non-steering position.

8. In a vehicle mechanism as defined in claim 7 said first and second portions of said shift lever being connected for unitary pivoting movement, a pin member extending into said notch in said shift cam and engageable with the second portion of said gear shift lever biased by said biasing means to resist movement of said second portion into said notch, means connecting said pin member with a part pivotal uopn pivoting movement of said driving member to withdraw said pin member from said notch and permit said biasing means to move said portion into said notch to effect pivoting movement of said gear shift lever upon pivoting movement of said driving member.

9. In a vehicle mechanism as defined in claim 7 wherein said first portion of said gear shift lever comprises a manually engageable portion pivotal relative to said second portion engageable with said shift cam, spring means biasing said first portion into an operative position, said first portion having sufficient extent to be engaged by a part of the steering wheel upon pivoting movement thereof to effect pivoting movement thereof.

10. In a vehicle mechanism, a vehicle steering wheel, a driving member connected to said vehicle steering wheel for rotation upon rotation of the steering wheel, a driven member rotatable upon rotation of the driving member, means interconnecting the driving and driven members to transmit rotary motion therebetween, means supporting said driving member for pivotal movement relative to said driven member about an axis transverse to the axis of rotation thereof to provide for movement of said steering wheel to a non-steering position, and a gear shift lever adjacent said driven member and movable relative thereto to effect hsifting of the drive of the vehicle and supported to pivot about a pivot axis, said gear shift lever having sufficient extent so as to be engaged by said steering wheel of the vehicle upon pivoting movement thereof so as to effect pivoting movement of the gear shift lever along with the movement of the steering wheel.

11. In a vehicle mechanism as defined in claim 10 further including a shift cam adjacent said gear shift lever and providing shift positions for said gear shift lever and said gear shift lever includes a manually engageable first portion pivotal relative to a second portion cooperable with said shift cam and spring means biases said first portion into a first position relative to said second portion and said first portion is engaged by said steering wheel to effect pivoting thereof.

12. In a vehicle mechanism as defined in claim 11 wherein said second portion has a portion thereof movable into a notch in said shift cam upon said pivoting movement.

13. In a vehicle mechanism as defined in claim 11 wherein said spring means comprises a spring member having a sleeve part encircling said first portion of said gear shift lever and a reaction part engaging said second portion of said gear shift lever.

14. In a vehicle mechanism as defined in claim 11 wherein said spring means comprises a generally U-shaped torsion spring member with the base thereof engaging said second portion of the gear shift lever and the legs thereof engaging the first portion of said gear shift lever.

15. A driving mechanism comprising a driving member, a driven member rotatable upon rotation of said driving member, means interconnecting said driving and driven members to transmit rotary motion therebetween, means supporting said driving member for pivotal movement relative to said driven member from an operative position to a storage position, a gear selector mechanism mounted adjacent said driven member and movable relative thereto to effect an engagement of gears operatively connected therewith, and means supporting at least a portion of said gear selector mechanism for pivoting movement relative to said driven member about an axis spaced from the axis of rotation of said driven member, and means for effecting pivoting movement of said portion of said gear selector mechanism about said axis in response to pivoting of said driving member to its storage position.

16. A driving mechanism comprising, a driving member adapted to be connected to a steering member for rotation upon rotation of said steering member, a driven member rotatable upon rotation of the driving member, means interconnecting the driving and driven members to transmit rotary motion therebetween, means supporting said driving member for pivotal movement relative to said driven member about an axis transverse to the axis of rotation of said driven member to provide for movement of said steering member to a non-steering position, a gear selector mechanism adjacent said driven member and movable relative thereto to actuate a transmission, and means supporting at least a portion of said gear selector mechanism for pivoting movement about a pivot axis which is spaced from the axis of rotation of said driven member, and means for effecting pivoting movement of said portion of said gear selector mechanism about said pivot axis in response to pivoting of said driving member to its non-steering position.

17. A mechanism comprising, a gear shift mechanism operatively connected with a transmission to actuate the transmission, a driving member, a driven member spaced from said driving member, means interconnecting said driving and driven members for transmitting rotary motion therebetween and providing for pivoting movement of said driving member relative to said driven member, means supporting said driving member for pivotal movement relative to said driven member, said gear shift mechanism being supported adjacent said driven member and movable to actuate the transmisison, and means for pivoting at least a portion of said gear shift mechanism in response to pivoting of said driving member relative to said driven member.

References Cited

UNITED STATES PATENTS 3,078,946   2/1963   Young _____ 74—493

MILTON KAUFMAN, *Primary Examiner.*